US009153531B1

(12) United States Patent
Roth et al.

(10) Patent No.: US 9,153,531 B1
(45) Date of Patent: Oct. 6, 2015

(54) METHODS AND APPARATUS FOR REDUCING CROSSTALK AND TWIST REGION HEIGHT IN ROUTING WIRES

(71) Applicant: Altera Corporation, San Jose, CA (US)

(72) Inventors: Aron Joseph Roth, North York (CA); Michael Chan, Scarborough (CA); Jeffrey Christopher Chromczak, Brownsville (CA)

(73) Assignee: Altera Corporation, San Jose, CA (US)

( * ) Notice: Subject to any disclaimer, the term of this patent is extended or adjusted under 35 U.S.C. 154(b) by 39 days.

(21) Appl. No.: 14/192,731

(22) Filed: Feb. 27, 2014

(51) Int. Cl.
*H01L 23/528* (2006.01)
*H01L 23/522* (2006.01)
*H01L 21/768* (2006.01)

(52) U.S. Cl.
CPC ...... *H01L 23/5221* (2013.01); *H01L 21/76838* (2013.01); *H01L 23/528* (2013.01)

(58) Field of Classification Search
CPC .......................... H01L 23/5221; H01L 23/528
See application file for complete search history.

(56) References Cited

U.S. PATENT DOCUMENTS

| | | | |
|---|---|---|---|
| 5,073,729 A | 12/1991 | Greene et al. | |
| 5,594,363 A | 1/1997 | Freeman et al. | |
| 5,777,887 A | 7/1998 | Marple et al. | |
| 5,818,730 A | 10/1998 | Young | |
| 6,163,167 A | 12/2000 | Young | |
| 6,242,947 B1 | 6/2001 | Trimberger | |
| 6,501,297 B1 | 12/2002 | Kong | |
| 7,279,929 B1 | 10/2007 | Young | |
| 7,557,611 B2 | 7/2009 | Kaptanoglu | |
| 7,784,010 B1 | 8/2010 | Balsdon et al. | |
| 8,458,640 B2 | 6/2013 | Gao | |
| 8,490,042 B2 | 7/2013 | Gao | |
| 2004/0178821 A1 | 9/2004 | Bal et al. | |
| 2009/0106531 A1 | 4/2009 | Kundu et al. | |
| 2010/0155956 A1* | 6/2010 | Werkheiser | 257/773 |
| 2010/0270671 A1* | 10/2010 | Holesovsky et al. | 257/734 |

* cited by examiner

*Primary Examiner* — Evan Pert

(57) ABSTRACT

An integrated circuit may have interconnect circuitry which may include a sequence of tiles. Each tile may be associated with a given tile type, and each tile type may include a predetermined routing of multiple wires on multiple tracks. Wires may change tracks within a given tile, which is sometimes also referred to as wire twisting. Wire twists may reduce the overlap between pairs of adjacent wires, thereby reducing the coupling capacitance between the respective wires. Reducing the coupling capacitance may result in reduced crosstalk between the wires which may speed up the signal transition along those wires. At the same time, the twist region height (i.e., the region in the tile in which wires are twisted) may be reduced compared to conventional interconnect circuitry.

26 Claims, 8 Drawing Sheets

METHODS AND APPARATUS FOR REDUCING CROSSTALK AND TWIST REGION HEIGHT IN ROUTING WIRES

BACKGROUND

This invention relates to integrated circuits and, more particularly, to interconnect circuitry in integrated circuits.

Integrated circuits such as programmable integrated circuits may include many components such as inputs, outputs, memory blocks, logic circuits, etc. Interconnect circuitry in the integrated circuit may route signals over wires between these components.

In an effort to ease chip design and providing a simple and regular layout, many integrated circuits such as programmable integrated circuits include multiple instantiations of a same tile of interconnect circuitry, which may be repeated across the entire integrated circuit. Such a tile of interconnect circuitry often has at least one wire starting in a given track and at least one other wire ending in another track with all other wires changing tracks. The change in tracks (e.g., every wire may be shifted one track to the right) is sometimes also referred to as wire twisting.

Accordingly, the portion of the interconnect circuitry in which the wire twisting occurs is sometimes also referred to as twisting region. The size of a twisting region depends on the number of wires and situations may arise in which the twisting region is bigger than the size of a tile of interconnect circuitry.

Furthermore, a wire that spans L tiles overlaps a neighboring wire for L−1 tiles in such a configuration. As design geometries shrink, a reduction in the spacing between wires results in increased interconnect capacitance, which is further exacerbated by the long spatial overlap between the adjacent wires. Situations frequently arise where signal delays are affected by effects such as crosstalk in which a signal toggling in an aggressor wire slows down the signal transition in a victim wire.

SUMMARY

In accordance with certain aspects of the invention, an integrated circuit may have interconnect circuitry that includes a sequence of tiles. Each tile in the sequence of tiles may be associated with a tile type, and each tile type may include a predetermined routing of a plurality of wires on a plurality of tracks. The sequence of tiles may include first and second tiles.

The first tile may be of a first tile type and have a first wire in the plurality of wires that starts in a first track. The second tile may be of a second tile type and have a second wire in the plurality of wires that starts in a second track that is different than the first track.

It is appreciated that the present invention can be implemented in numerous ways, such as a process, an apparatus, a system, a device, or a method on a computer readable medium. Several inventive embodiments of the present invention are described below.

In certain embodiments, the above-mentioned interconnect circuitry may include third and fourth tiles in the sequence of tiles. The third tile may be associated with the first tile type, and the first wire may end in a third track that is different than the first and second tracks. The fourth tile may be associated with the second tile type, wherein the second wire may end in a fourth track that is different than the first, second, and third tracks.

If desired, the interconnect circuitry may include a third tile of a third tile type, and each wire that enters the third tile on a first side exits the third tile on a second side.

Further features of the invention, its nature and various advantages, will be more apparent from the accompanying drawings and the following detailed description of the embodiments.

DETAILED DESCRIPTION

The present invention relates to integrated circuits and, more particularly, to interconnect circuitry in integrated circuits.

Integrated circuits such as programmable integrated circuits may include multiple instantiations of a same tile of interconnect circuitry, which may be repeated across the entire integrated circuit. A tile may have multiple tracks. Wires may start in a tile, end in a tile, start and end in a tile, or traverse a tile. Wires may also change tracks inside a tile. The change in tracks during which a wire is shifted from one track to another is sometimes also referred to as wire twisting.

Accordingly, the portion of the interconnect circuitry in which the wire twisting occurs is sometimes also referred to as twisting region or twist region. A large twist region may span across the tile boundary, which may add complexity to the development of the interconnect circuitry. A large twist region may also shorten the extent of starting and ending wires into the tile, which may complicate the connectivity to those wires. Therefore, it may be desirable to limit the size of the twist region to facilitate the implementation of interconnect circuitry using a sequence of tiles.

As design geometries shrink, a reduction in the spacing between wires results in increased interconnect capacitance and increased crosstalk, which depends on the spatial overlap between adjacent wires. It may therefore be desirable to implement interconnect circuitry with short overlap between adjacent wires.

It will be recognized by one skilled in the art, that the present exemplary embodiments may be practiced without some or all of these specific details. In other instances, well-known operations have not been described in detail in order not to unnecessarily obscure the present embodiments.

Figure 1:
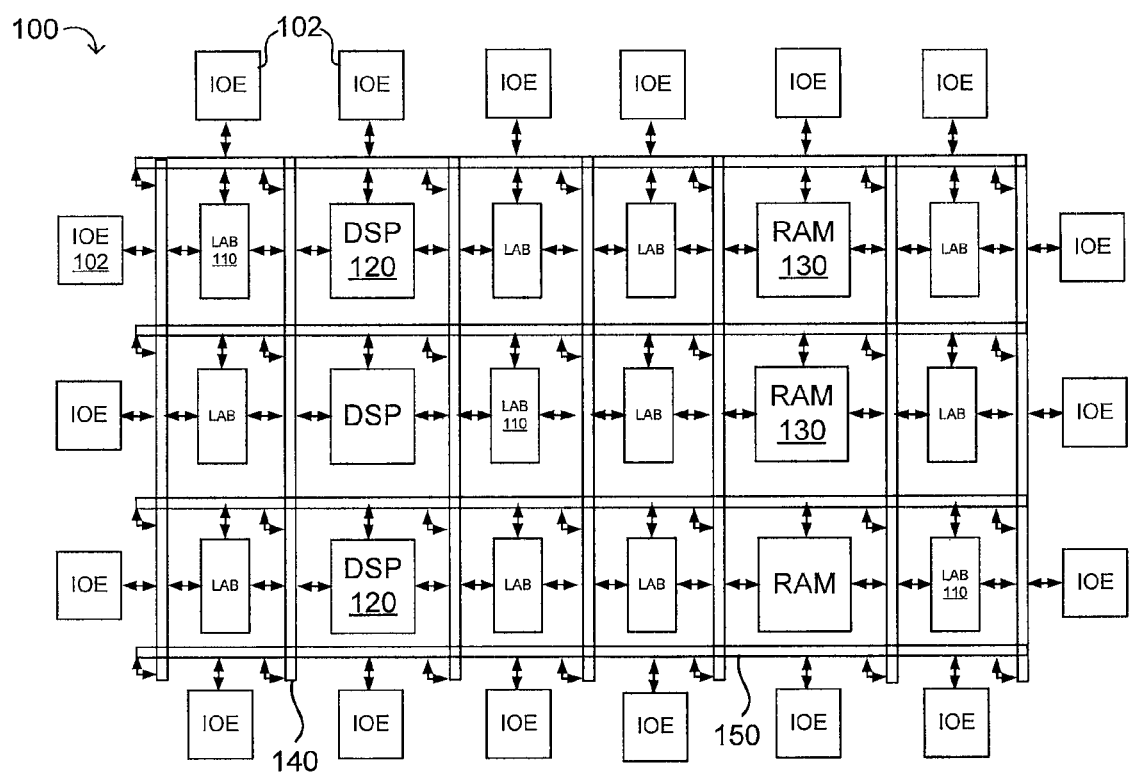
FIG. 1 is a diagram of an illustrative integrated circuit having an exemplary routing topology in accordance with an embodiment.

An illustrative embodiment of an integrated circuit such as programmable logic device (PLD) 100 having an exemplary interconnect circuitry is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals In addition, the programmable logic device may have input/output elements (IOEs) 102 for driving signals off of PLD and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire.

Routing wires may be shorter than the entire length of the routing channel. A length n wire may span n functional blocks. For example, a length four wire may span four blocks. Length four wires in a horizontal routing channel may be referred to as "H4" wires, whereas length four wires in a vertical routing channel may be referred to as "V4" wires.

Different PLDs may have different functional blocks which connect to different numbers of routing channels. A three-sided routing architecture is depicted in FIG. 1 where input and output connections are present on three sides of each functional block to the routing channels. Other routing architectures are also intended to be included within the scope of the present invention. Examples of other routing architectures include 1-sided, 1-sided, 2-sided, and 4-sided routing architectures.

In a direct drive routing architecture, each wire is driven at a single logical point by a driver. The driver may be associated with a multiplexer which selects a signal to drive on the wire. In the case of channels with a fixed number of wires along their length, a driver may be placed at each starting point of a wire.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments of the present invention may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
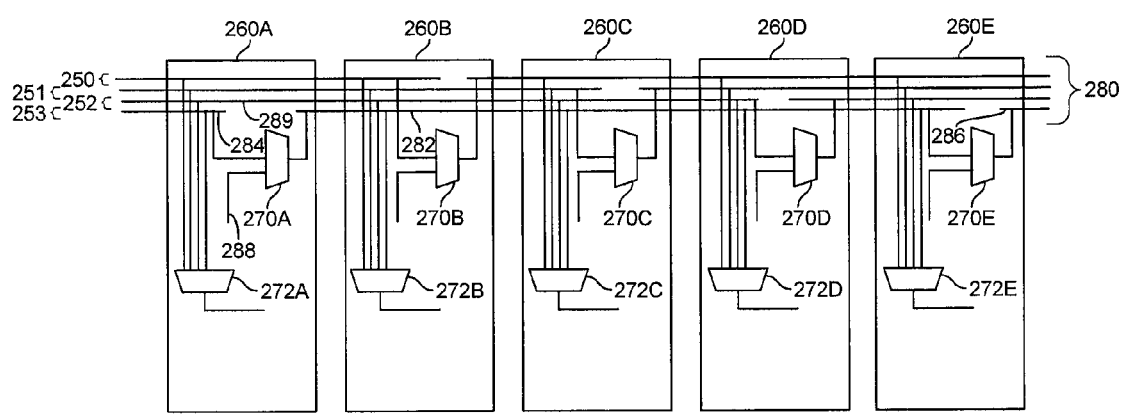
FIG. 2 is a diagram of an illustrative direct drive routing channel with staggered wires in accordance with an embodiment.

FIG. 2 shows such a direct drive horizontal routing channel 280 including a single bundle of wires across functional blocks 260. Each functional block 260 may have a driver (not shown) to drive a signal on a wire that starts in the respective functional block (e.g., wire 286).

Each driver may be associated with a multiplexer such as multiplexer 270. For example, multiplexer 270E may be configured to select a signal to drive on wire 286, and multiplexer 270A may be configured to select a wire that ends in the respective functional block (e.g., wire 284). Connecting a wire that ends in a functional block to a wire that starts in that identical functional block is sometimes also referred to as "wire stitching" or stitching. If desired, tri-states may perform the wire stitching instead of multiplexers 270, which may result in a bi-directional routing channel 280. Alternatively, wires may perform the wire stitching. In other words, wires may directly connect to other wires to implement a long wire (not shown).

If desired, multiplexer 270E may be configured to select a signal from a different wire. For example, multiplexer 270E may select a signal from a wire driven by a block within functional block 260E. Multiplexer 270E may also select a signal from a wire in another routing channel such as a signal from a wire in a vertical routing channel that ends in the respective functional block (not shown).

Each functional block 260 may include one or more multiplexers 272 (e.g., multiplexer 272A in functional block 260A), which may be configured to route a wire of routing channel 280 to a block within the respective functional block 260.

As shown, each wire of routing channel 280 is unidirectional from left to right and has a length of four. In other words, a wire that starts in functional block 260A will end in the functional block 260E. If desired, routing channel 280 may be bi-directional (e.g., with tri-state buffers performing the wire stitching) or unidirectional from right to left (e.g., with multiplexers performing wire stitching in the opposite direction as shown in FIG. 2). If desired, the wires in routing channel 280 may have any length. For example, the wires may have a length of two which may require wire stitching in every other functional block 260.

Routing channel 280 as shown also has different wires that start and end in different functional blocks 260 and thus may be stitched in the respective functional block. For example, the wire in track 250 may be stitched in functional block 260B, the wire in track 251 may be stitched in functional block 260C, etc. An arrangement in which different wires from the same bundle of wires may be stitched together in different functional blocks is sometimes also referred to as staggered wiring or a routing channel with staggered wires. An arrangement in which staggered wires are stitched together in adjacent functional blocks is sometimes also referred to as single staggered wiring.

The single staggered wiring shown in FIG. 2 has the effect that any two adjacent wires in routing channel 280 overlap each other for approximately three functional blocks. For example, wire 289 overlaps wire 282 from functional block 260A in which wire 282 starts until functional block 260D in which wire 289 ends, which may result in crosstalk effects due to the capacitive coupling between the two wires.

If desired, the wires in routing channel 280 may be twisted (i.e., change tracks, which is not shown) to allow for a regular layout in which the respective multiplexer 270 always drives a wire in track 253 and always receives a wire from track 250 of routing channel 280. As an example consider wire 282, which starts in functional block 260A. In functional block 260B, wire 282 may be twisted and pass from track 253 to track 252. Similarly, all neighboring wires may be twisted in the same direction to free track 252. Since wire 282 is now in track 252, a new wire may start in track 253 in functional block 260B. Subsequently, wire 282 may pass from track 252 to track 251 in functional block 260C, from track 251 to track 250 in functional block 260D, and end in track 250 in functional block 260E.

Figure 3:
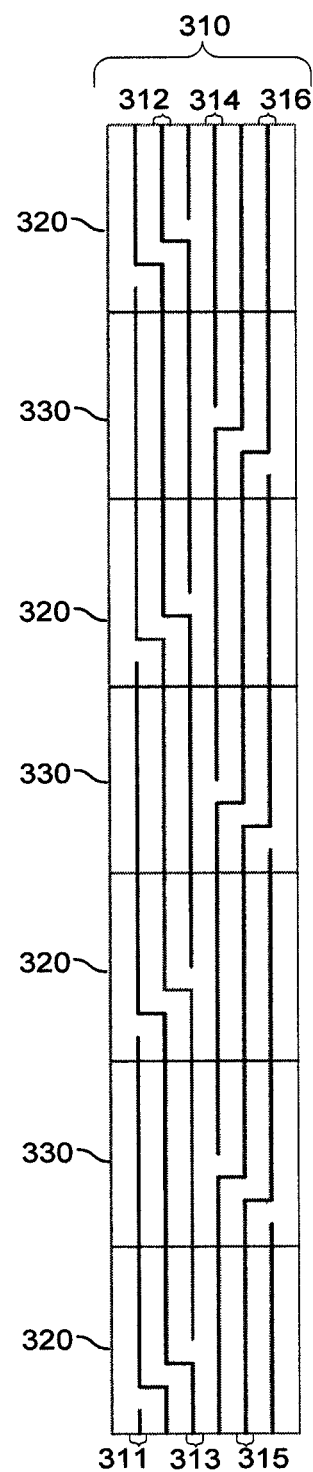
FIG. 3 is a diagram of an illustrative interconnect circuit with an even number of tracks and two tile types in accordance with an embodiment

FIG. 3 shows an illustrative interconnect circuit 310 with twisted wires and a regular layout, which repeatedly alternates tiles of tile types 320 and 330 in a sequence of tiles. As shown, interconnect circuit 310 may route W=6 wires of length L=6 (i.e., each wire spans over six tiles) on an even number of tracks T=6 (i.e., tracks 311 to 316). The wires in interconnect circuit 310 are divided into N=2 bundles with each bundle having W/N=3 wires. Each bundle of wires has staggered wires that are stitched together every N=2 tiles. Such an arrangement in which staggered wires of a bundle are stitched together every other functional block is sometimes also referred to as double-staggered wiring or double-staggering.

The description and representation of interconnect circuit 310 as a unidirectional, top to bottom, vertical routing channel (i.e., wires enter a tile on the top and exit a tile on the bottom) with six tracks and wires of length six is not intended to limit the scope of the present invention. If desired, interconnect circuit 310 may be bidirectional or unidirectional from bottom to top and run along any axis in the integrated circuit. Interconnect circuit 310 may further include wires of arbitrary length and have an arbitrary even number of tracks.

As shown, each tile of tile type 320 may include a wire that starts in track 311 and a wire that ends in track 313. Wires that enter a tile of tile type 320 on tracks 311 and 312 are routed one track to the right. Thus, a wire that enters a tile of tile type 320 on track 311 exits the tile on track 312, and a wire that enters a tile of tile type 320 on track 312 exits the tile on track 313. All other wires enter and exit a tile of tile type 320 on the same track. For example, wires that enter a tile of tile type 320 on tracks 314, 315, and 316 exit the tile on tracks 314, 315, and 316, respectively.

Tiles of tile type 330 may include a wire that starts in track 316 and a wire that ends in track 314. Wires that enter a tile of tile type 330 on tracks 315 and 316 are routed one track to the left. Thus, a wire that enters a tile of tile type 330 on track 315 exits the tile on track 314, and a wire that enters a tile of tile type 330 on track 316 exits the tile on track 315. All other wires enter and exit a tile of tile type 330 on the same track. For example, wires that enter a tile of tile type 330 on tracks 311, 312, and 313 exit the tile on tracks 311, 312, and 313, respectively.

As shown in FIG. 3, any two adjacent wires in interconnect circuit 310 overlap each other for approximately four tiles. Thus, a wire of length L overlaps any other adjacent wire for only L−2 tiles. In comparison, a wire of length L in routing channel 280 of FIG. 2 overlaps any other adjacent wire for L−1 tiles, where two adjacent wires of length four overlap each other for approximately three functional blocks. Thus, interconnect circuit 310 may exhibit a reduced capacitive coupling between adjacent wires due to the reduced spatial overlap, and thereby may be less affected by crosstalk effects compared to routing channel 280.

The length or height of a twist region (i.e., the portion of the tile in which wires are twisted) is primarily dependent on the number of twisted wires with everything else (e.g., process geometries and design rules) being equal. Thus, tiles of tile types 320 and 330 may have a reduced twist region height compared to routing channel 280. In tiles of tile type 320 and 330 with T tracks only (T/2−1) wires may be twisted, while (T−1) wires may be twisted in routing channel 280 of FIG. 2.

Figure 4:
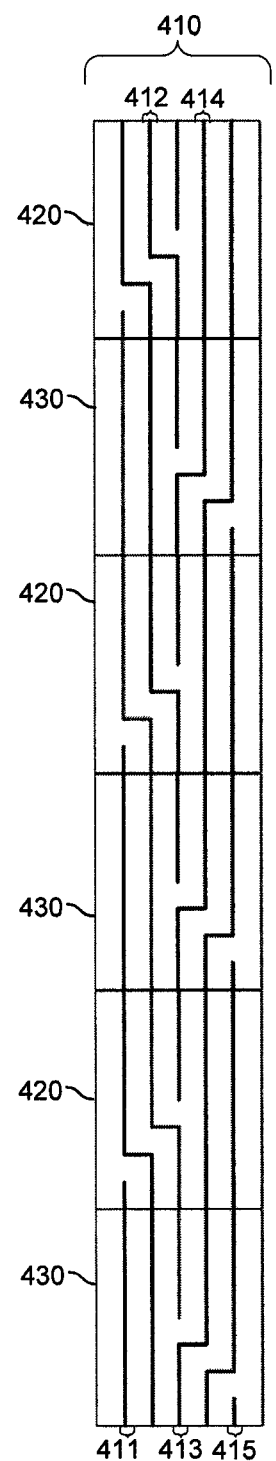
FIG. 4 is a diagram of an illustrative interconnect circuit with an odd number of tracks and two tile types in accordance with an embodiment.

Double-staggering as shown in FIG. 3 may require that the number of wires W in interconnect circuit 310 is divisible by two. Thus, any interconnect circuit with an odd number of wires is not divisible by two. An embodiment of an interconnect circuit that enables double-staggering for an odd number of wires is shown in FIG. 4.

Interconnect circuit 410 includes twisted wires and repeatedly alternates tiles of tile types 420 and 430 in a sequence of tiles. As shown, interconnect circuit 410 may route W=5 wires of length L=5 (i.e., each wire spans over five tiles) on an odd number of tracks T=5 (i.e., tracks 411 to 415).

Similar to interconnect circuit 310 of FIG. 3, interconnect circuit 410 is shown and described as a unidirectional, top to bottom, vertical routing channel (i.e., wires enter a tile on the top and exit a tile on the bottom) with five tracks and wires of length five, which is not intended to limit the scope of the present invention. If desired, interconnect circuit 410 may be bidirectional or unidirectional from bottom to top and run along any axis in the integrated circuit. Interconnect circuit 410 may further include wires of arbitrary length and have an arbitrary odd number of tracks.

As shown, each tile of tile type 420 may include a wire that starts in track 411 and a wire that ends in track 413. Wires that enter a tile of tile type 420 on tracks 411 and 412 are routed one track to the right. Thus, a wire that enters a tile of tile type 420 on track 411 exits the tile on track 412, and a wire that enters a tile of tile type 420 on track 412 exits the tile on track 413. All other wires enter and exit a tile of tile type 420 on the same track. For example, wires that enter a tile of tile type 420 on tracks 414 and 415 exit the tile on tracks 414 and 415, respectively.

Tiles of tile type 430 may include a wire that starts in track 415 and a wire that ends in track 413. Wires that enter a tile of tile type 430 on tracks 414 and 415 are routed one track to the left. Thus, a wire that enters a tile of tile type 430 on track 415 exits the tile on track 414, and a wire that enters a tile of tile type 430 on track 414 exits the tile on track 413. All other wires enter and exit a tile of tile type 430 on the same track. For example, wires that enter a tile of tile type 420 on tracks 411 and 412 exit the tile on tracks 411 and 412, respectively.

As shown, tiles of tile type 420 and 430 both share access to track 413 and have a wire end in track 413. Thus, a wire that starts in a tile of tile type 420 ends in a tile of tile type 430 and vice versa. For example, a wire that starts in track 411 in a tile of tile type 420 ends in track 413 in a tile of tile type 430 and may be stitched to a starting wire in track 415.

If desired, wires may start in track 413 for both tile types and end in either track 411 or 415. Consider for example that interconnect circuit 410 is unidirectional from bottom to top. In this example, a wire that starts in track 413 of a tile of tile type 430 ends in track 411 of a tile of tile type 420, and a wire that starts in track 413 of a tile of tile type 420 ends in track 415 of tile of tile type 430.

Such an arrangement in which staggered wires that start in a tile of a first tile type are stitched together in a tile of a second tile type is sometimes also referred to as tire tread-staggering.

As shown in FIG. 4, any two adjacent wires in interconnect circuit 410 overlap each other for approximately three tiles. Thus, a wire of length L overlaps any other adjacent wire for only L−2 tiles. In comparison, a wire of length L in routing channel 280 of FIG. 2 overlaps any other adjacent wire for L−1 tiles, where two adjacent wires of length four overlap each other for approximately three functional blocks. Thus, similar to interconnect circuit 310 of FIG. 3, interconnect circuit 410 may exhibit a reduced capacitive coupling between adjacent wires due to the reduced spatial overlap, and thereby may be less affected by crosstalk effects compared to routing channel 280.

The tiles of tile types 420 and 430 may also have a reduced twist region height compared to routing channel 280. In tiles of tile type 420 and 430 with T tracks only (T/2−0.5) wires may be twisted, while (T−1) wires may be twisted in routing channel 280 of FIG. 2.

Double-staggering and tire tread-staggering may be extended to N-staggering for any number of wires at the cost of having an increased number of tile types. N-staggering may limit the maximum overlap between any two adjacent wires of length L to L−N+1 with the average overlap being approximately L−N. At the same time, the number of twisted wires per tile and thereby the potential twist region height of T tracks may be limited to (T−1)/N.

Figure 5:
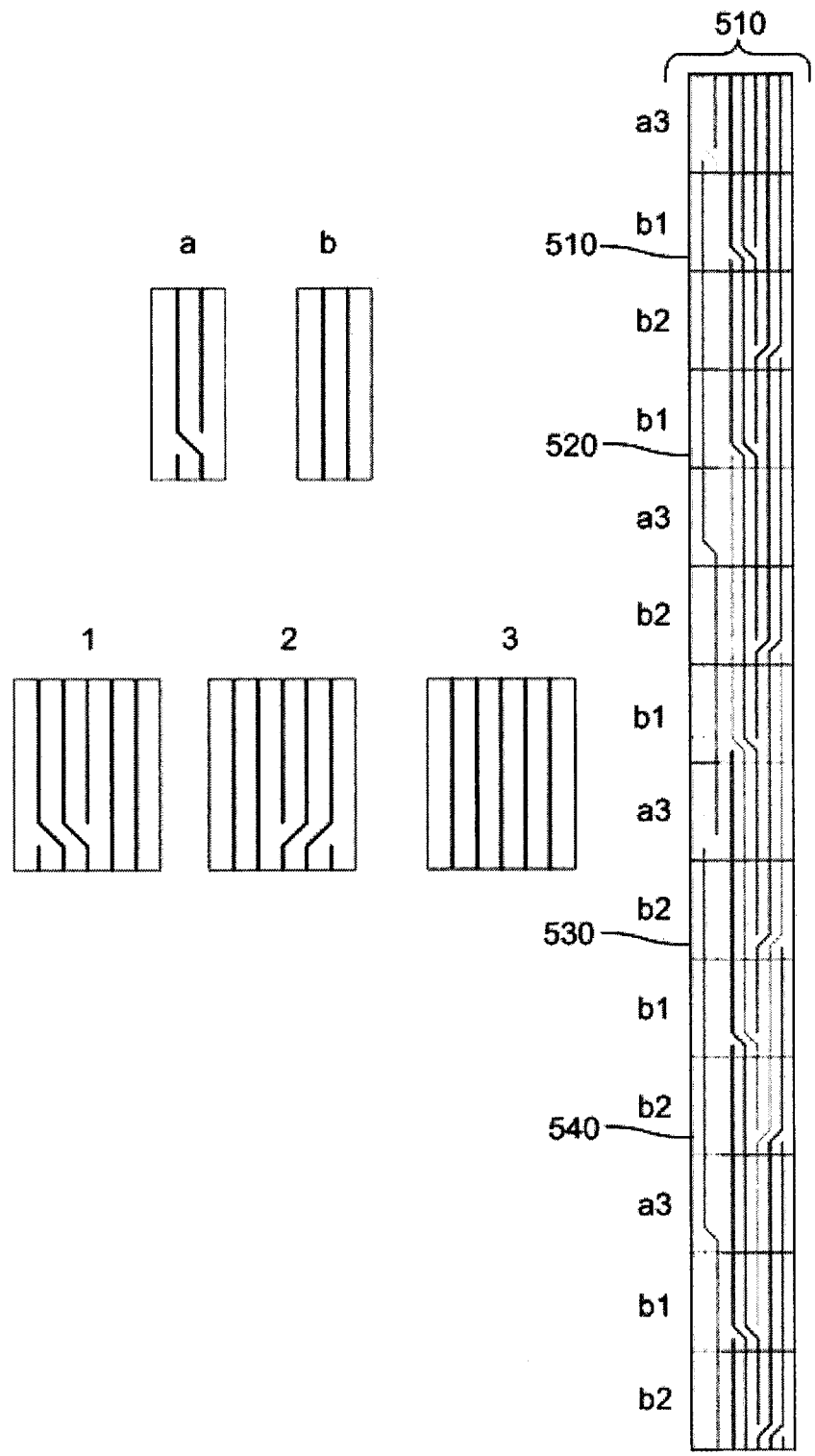
FIG. 5 is a diagram showing an illustrative sequence of tiles that combines two tiles with two tracks for a first wire partition and three tiles with five tracks for a second wire partition in accordance with an embodiment.

An embodiment of an interconnect circuit with T=7 tracks and triple-staggering (i.e., N=3) of W=7 wires of length L=7 is shown in FIG. 5. The seven wires may be partitioned into a first bundle of W1=2 wires and a second bundle of W2=5 wires. The first bundle may have two tile types "a" and "b". Tile type "a" may start a wire in the left track, end a wire in the right track, and have a twist from the left to the right track. Tile type "b" may have two wires that enter and exit the tile on the same track.

The second bundle may have three tile types "1", "2", and "3". Tile types "1" and "2" may implement the same tire tread staggering as tile types 420 and 430 of FIG. 4. Tile type "3" may have five wires that enter and exit the tile on the same track. Tile types "a" and "b" of the first bundle and tile types "1", "2", and "3" may be combined to form tile types "a3", "b1", and "b2". Tile types "a3", "b1", and "b2" combine tile types "a" and "b" of the first bundle with tile types "3", "1", and "2" of the second bundle.

As shown in FIG. 5, a sequence of 14 tiles of tile types "a3", "b1", and "b2" may form interconnect circuit 510 which may be repeated in the same sequence throughout an integrated circuit to form a longer interconnect circuit.

Similar to interconnect circuit 310 of FIG. 3, interconnect circuit 510 is shown and described as a unidirectional, top to bottom, vertical routing channel (i.e., wires enter a tile on the top and exit a tile on the bottom) with seven tracks and wires of length seven, which is not intended to limit the scope of the present invention. If desired, interconnect circuit 510 may be bidirectional or unidirectional from bottom to top and run along any axis in the integrated circuit. The twists in interconnect circuit 510 are shown to have a 45 degree angle relative to the tracks. In fact, the twist may have any angle that allows the wire to switch from one track to another track. An allowable range for the twist angle may be determined by several factors including design rules and optimization criteria such as minimal area use.

As shown in FIG. 5, the most adjacent wires overlap each other for three or four tiles. Only two wire pairs overlap each other for five tiles, which are the wires that start in tiles 510 and 520 of tile type "b1" and the wires that start in tiles 530 and 540 of tile type "b2". Those wire pairs are the only adjacent wire pairs to start two tiles apart, which is caused by the same tile type being used only two tiles apart. Thus, the tail portion of the first wires (i.e., the wires starting in tiles 510 and 530) overlap the beginning portion of the second wires (i.e., the wires starting in tile 520 and 540), respectively.

At the same time, each tile of interconnect circuit 510 may twist a maximum of two wires. For example, tile type "a3" only twists one wire in sub-tile type "a", while tile types "b1" and "b2" twist two wires in sub-tile types "1" and "2", respectively.

Situations frequently arise where unrelated wires may have been placed in proximity of an interconnect circuit. For example, a wire stub that has a length that is less than the length of a tile may have been placed near an interconnect circuit with the purpose of passing a connection through the layer of the interconnect circuit. Such unrelated wires may be beneficially interleaved with the interconnect circuit and act as a shield between otherwise adjacent wires.

Figure 6:
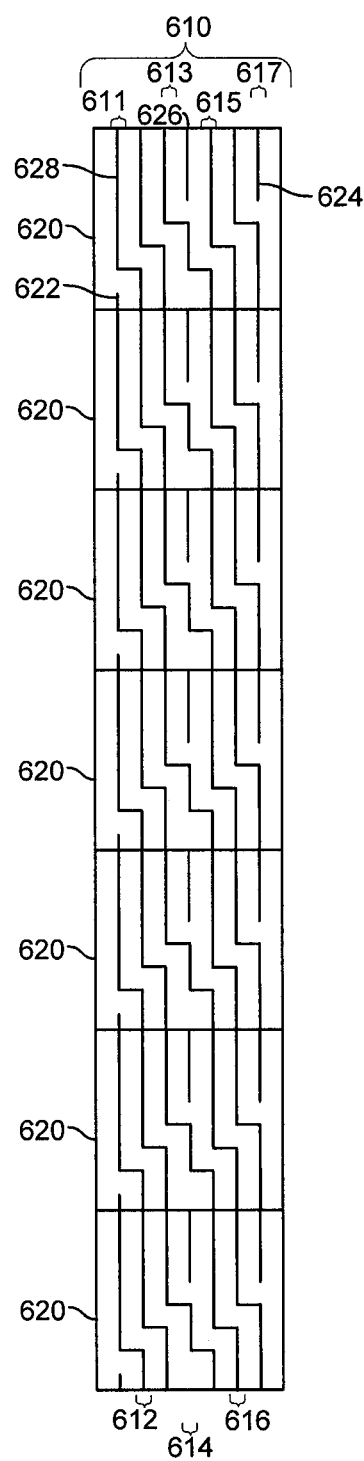
FIG. 6 is a diagram showing an illustrative interconnect circuit with interleaving of unrelated tracks in accordance with an embodiment.

FIG. 6 shows an embodiment of interconnect circuit 610 that interleaves wire stub 626 such that the overlap between adjacent wires is reduced. Interconnect circuit 610 includes twisted wires and repeatedly iterates tiles of tile type 620 in a sequence of tiles. As shown, interconnect circuit 610 may route W=6 wires of length L=6 tiles (i.e., each wire spans over six tiles) and N=1 wire of length L<1 tile on T=7 tracks (i.e., tracks 611 to 617).

Similar to interconnect circuit 310 of FIG. 3, interconnect circuit 610 is shown and described as a unidirectional, top to bottom, vertical routing channel (i.e., wires enter a tile on the top and exit a tile on the bottom) with seven tracks and wires of length six interleaved with a wire stub, which is not intended to limit the scope of the present invention. If desired, interconnect circuit 610 may be bidirectional or unidirectional from bottom to top and run along any axis in the integrated circuit. Interconnect circuit 610 may further include wires of arbitrary length, have an arbitrary number of tracks, and interleave an arbitrary number of wire stubs.

As shown, each tile of tile type 620 may include a wire that starts in track 611 (e.g., wire 622) and a wire that ends in track 617 (e.g., wire 624). Wires that enter a tile of tile type 620 on tracks 611, 612, 615, and 616 may be routed one track to the right. Thus, a wire that enters a tile of tile type 620 on track 611, 612, 615, or 616 may exit the tile on track 612, 613, 616, or 617, respectively. Wire 626 is the wire stub that may be interleaved at track 614.

A wire that enters a tile of tile type 620 on the left side of wire stub 626 (i.e., on track 613) may be twisted twice to the right. For example, the wire may be routed from track 613 to 614, along track 614 for a predetermined length, and then from track 614 to track 615 on which the wire may exit the tile.

As shown in FIG. 6, any pair of adjacent wires (e.g., wire 622 and wire 628) may overlap each other for two tiles before being separated by the wire stub and then overlap each other again for two more tiles. Thus, any pair of adjacent wires may overlap each other for four tiles. Interleaving more wire stubs may further reduce the overlap of adjacent wires. For example, inserting N<L wire stubs may limit the overlap of adjacent wires of length L to L−N−1 tiles.

The twist region height may depend on the shape of the wire that is twisted twice. In particular, the predetermined length between the two twists (i.e., the distance that a wire is routed on the track occupied by wire stub 626). For example, introducing N wire stubs may limit the twist region height of T tracks to (T−N)/(N+1) twists if the modulo division of (T−N)/(N+1) is zero (i.e., mod((T−N)/(N+1))=0) or 1+(T−N)/(N+1) if the modulo division of (T−N)/(N+1) is non zero (i.e., mod((T−N). (N+1))≠0). Thus, in the example of FIG. 6, the twist region height may be limited to three twists.

Figure 7:
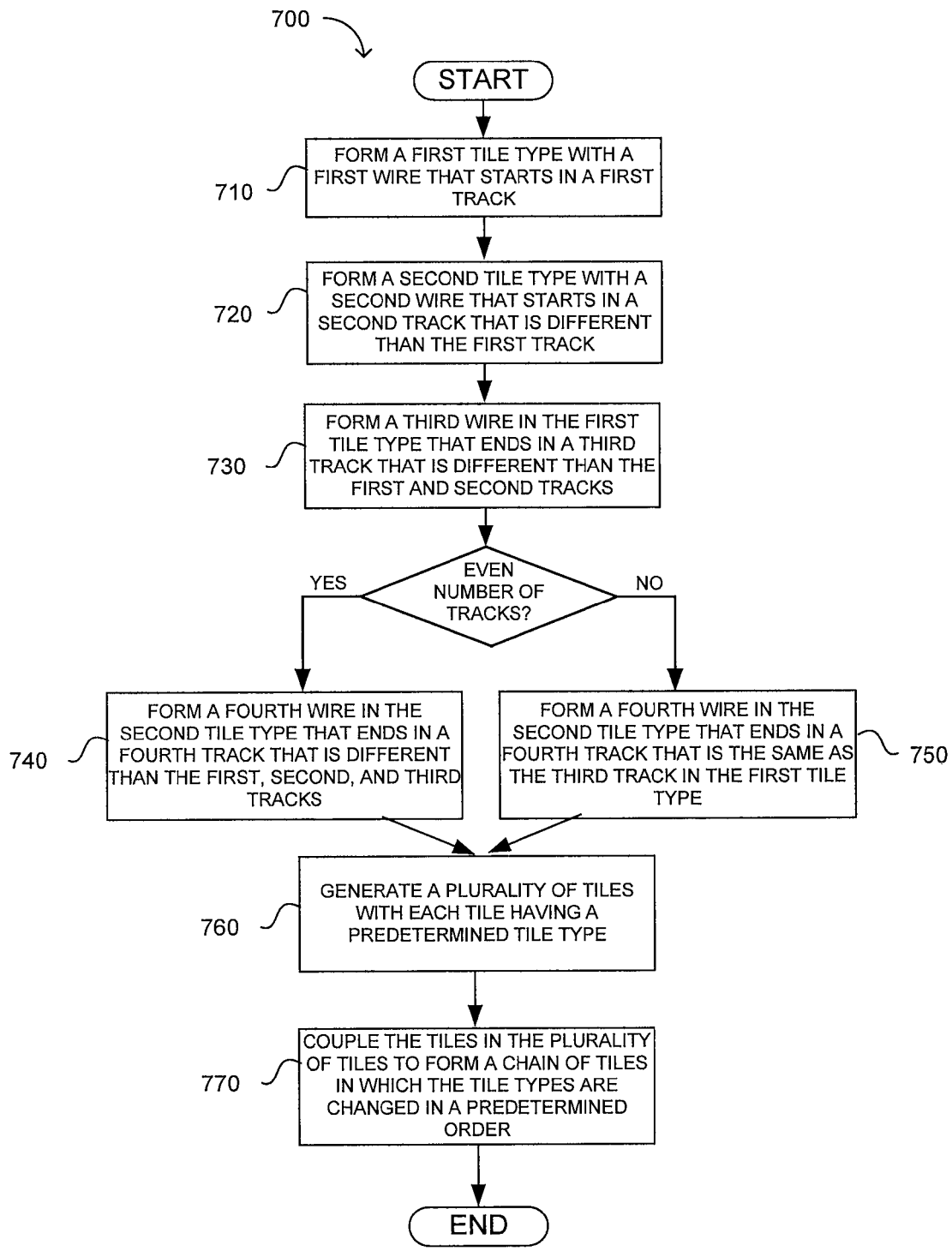
FIG. 7 is a flow chart showing illustrative steps for generating a plurality of tiles and coupling these tiles to form an interconnect circuit in accordance with an embodiment.

FIG. 7 is a flow chart of illustrative steps for arranging wires in tiles of different tile types and coupling these tiles to form an interconnect circuit. During step 710, a first tile type may include a first wire that starts in a first track. During step 720, a second tile type may be formed with a second wire that starts in a second track that is different than the first track. For example, two tile types such as tile types 320 and 330 of FIG. 3 may be formed with wires starting in tracks 311 and 316, respectively.

During step 730, a third wire may be formed in the first tile type that ends in a third track that is different than the first and second tracks. For example, tile type 320 of FIG. 3 may include a wire that ends in track 313.

A fourth wire may be formed in the second tile type. In the event that the interconnect circuit has an even number of tracks, the fourth wire may end in a fourth track that is different than the first, second, and third tracks during step 740. For example, tile type 330 of FIG. 3 may have a wire that ends in track 314, which is different than tracks 311, 313, and 316. In the event that the interconnect circuit has an odd number of tracks, the fourth wire may end in a fourth track that is the same as the third track in the first tile type during step 750. For example, tile type 430 of FIG. 4 may have a wire that ends in track 413, which is the same as track 413 in which the third wire ends in the first tile type.

During step 760, a plurality of tile with each tile having a predetermined tile type may be generated. During step 770, the generated tiles may be coupled together to form a chain of tiles in which the tile types are changed in a predetermined order. For example, interconnect circuit 310 of FIG. 3 may alternate between tiles of tile types 320 and 330 to form a sequence of tiles.

Figure 8:
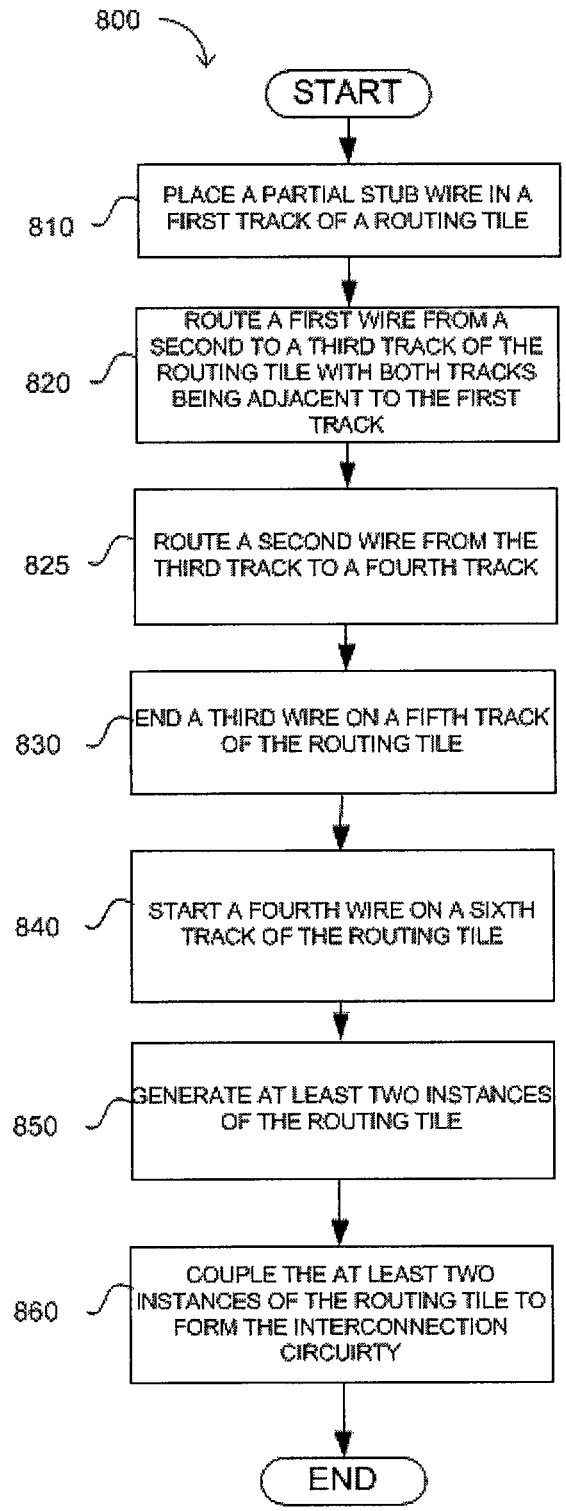
FIG. 8 is a flow chart showing illustrative steps for forming an interconnect circuit by interleaving unrelated tracks in accordance with an embodiment.

FIG. 8 is a flow chart of illustrative steps for arranging wires in a routing tile by interleaving a partial stub wire to form an interconnect circuit. During step 810, the partial stub wire may be placed in a first track of the routing tile. For example, wire stub 626 of FIG. 6 may be placed on track 614 of interconnect circuit 610.

During step 820, a first wire may be routed from a second to a third track of the routing tile with both tracks being adjacent to the first track. For example, the wire in track 613 of FIG. 6 may be twisted from track 613 to track 615 via track 614.

During step 825, a second wire may be routed from the third track to a fourth track. For example, the wire in track 615 of FIG. 6 may be routed to track 616. During step 830, the routing tile may end a third wire on a fifth track and start a fourth wire on a sixth track during step 840. For example, wire 624 of FIG. 6 that enters the routing tile on track 617 may end on track 617, and wire 622 that starts on track 611 may leave the routing tile on track 611.

During step 850, at least two instances of the routing tile may be generated. These at least two instances of the routing tile may be coupled to form the interconnection circuitry during step 860. For example, multiple instances of tiles of tile type 620 coupled together may form interconnect circuit 610.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of using interface circuitry with reduced spatial overlap between adjacent wires is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method for arranging wires in interconnection circuitry on an integrated circuit, comprising:
    forming a first tile type with a first wire that starts in a first track;
    forming a second tile type with second and third wires, wherein the second wire starts in a second track that is different than the first track, and wherein the third wire is routed from the second track to a track that is different than the first and second tracks;
    forming a plurality of tiles, wherein each tile has a predetermined tile type, and wherein the plurality of tiles includes at least one tile having the first tile type and one other tile having the second tile type; and
    coupling the tiles in the plurality of tiles to form a chain of tiles in which the tile types are arranged in a predetermined order.

2. The method of claim 1, wherein forming the first tile type further comprises:
    routing a fourth wire from the first track to a track that is different than the first and second tracks.

3. The method of claim 1, wherein forming the first tile type further comprises:
    forming a fourth wire that ends in a third track that is different than the first and second tracks.

4. The method of claim 3, wherein forming the second tile type further comprises:
    forming a fifth wire that ends in a fourth track that is different than the first, second, and third tracks.

5. The method of claim 3, wherein forming the second tile type further comprises:
    forming a fifth wire that ends in a fourth track that is the same as the third track in the first tile type.

6. The method of claim 1, further comprising:
    forming a third tile type with each entering wire routed to an outgoing wire.

7. The method of claim 1, further comprising:
   forming a third tile type with incoming wires driving each exiting wire.
8. A method for forming interconnection circuitry, comprising:
   placing a partial stub wire in a first track of a routing tile;
   routing a first wire from a second to a third track of the routing tile, wherein the second and third tracks are adjacent to the first track;
   routing a second wire from the third track to a fourth track;
   generating at least two instances of the routing tile; and
   coupling the at least two instances of the routing tile to form the interconnection circuitry.
9. The method of claim 8, further comprising:
   ending a third wire on a fifth track that is different than the first, second, third, and fourth track.
10. The method of claim 8, further comprising:
    ending a third wire on a track selected from the set consisting of first, second, third, and fourth track.
11. The method of claim 8, further comprising:
    starting a fourth wire on a sixth track that is different than the first, second, third, and fourth track.
12. The method of claim 8, further comprising:
    starting a fourth wire on a track selected from the set consisting of first, second, third, and fourth track.
13. The method of claim 8, wherein routing the first wire further comprises:
    bending the wire to connect the second and third tracks.
14. The method of claim 8, wherein routing the first wire further comprises:
    crossing the first track in a first metal layer using two via connections and a wire in a second metal layer.
15. Interconnect circuitry on an integrated circuit, comprising:
    a sequence of tiles, wherein each tile in the sequence of tiles is associated with a tile type, and wherein each tile type includes a predetermined routing of a plurality of wires on a plurality of tracks, wherein the sequence of tiles comprises:
       a first tile of a first tile type in the sequence of tiles that has a first wire in the plurality of wires, wherein the first wire has an endpoint in a first track in the plurality of tracks; and
       a second tile of a second tile type in the sequence of tiles that has second and third wires in the plurality of wires, wherein the second wire has an endpoint in a second track in the plurality of tracks that is different than the first track, wherein the third wire is routed from the second track to another track in the plurality of tracks, and wherein the other track is different than the first and second tracks.
16. The interconnect circuitry of claim 15, wherein the first tile further comprises:
    a fourth wire in the plurality of wires routed from the first track to a third track in the plurality of tracks.
17. The interconnect circuitry of claim 15, further comprising:
    a third tile in the sequence of tiles, wherein the third tile is associated with the first tile type, wherein the first wire has an endpoint in a third track in the plurality of tracks, and wherein the third track is different than the first and second tracks.
18. The interconnect circuitry of claim 17, further comprising:
    a fourth tile in the sequence of tiles, wherein the fourth tile is associated with the second tile type, wherein the second wire has an endpoint in a fourth track in the plurality of tracks, and wherein the fourth track is different than the first, second, and third tracks.
19. The interconnect circuitry of claim 15, further comprising:
    a third tile in the sequence of tiles, wherein the third tile is associated with the second tile type, wherein the first wire has an endpoint in a third track in the plurality of tracks, and wherein the third track is different than the first and second tracks.
20. The interconnect circuitry of claim 19, further comprising:
    a fourth tile in the sequence of tiles, wherein the fourth tile is associated with the first tile type, and wherein the second wire has an endpoint in the third track.
21. The interconnect circuitry of claim 15, further comprising:
    a third tile of a third tile type in the sequence of tiles, wherein each wire in the plurality of wires that enters the third tile on a first side exits the third tile on a second side.
22. The interconnect circuitry of claim 15, further comprising:
    a third tile of a third tile type in the sequence of tiles, wherein each wire in the plurality of wires that exits the third tile on a first side enters the third tile on a second side.
23. The interconnect circuitry of claim 15, further comprising:
    an additional sequence of tiles coupled to the sequence of tiles, wherein the additional sequence of tiles and the sequence of tiles include the same number of tiles.
24. The interconnect circuitry of claim 23, wherein the tiles in the additional sequence of tiles have a predetermined order of tile types, and wherein the tiles in the sequence of tiles have the same predetermined order of tile types.
25. The interconnect circuitry of claim 24, wherein any pair of adjacent wires in the plurality of wires that spans L tiles is adjacent for at most L−2 tiles.
26. The interconnect circuitry of claim 15, wherein each tile in the sequence of tiles has T tracks and at most T/2 wires in the plurality of wires that change tracks.

* * * * *